US010565425B2

(12) United States Patent
Cai (10) Patent No.: US 10,565,425 B2
(45) Date of Patent: Feb. 18, 2020

(54) UNDER-SCREEN BIOMETRIC IDENTIFICATION APPARATUS, BIOMETRIC IDENTIFICATION COMPONENT AND TERMINAL DEVICE

(71) Applicant: SHENZHEN GOODIX TECHNOLOGY CO., LTD., Shenzhen (CN)

(72) Inventor: Jun Cai, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/113,457

(22) Filed: Aug. 27, 2018

(65) Prior Publication Data

US 2018/0365472 A1   Dec. 20, 2018

Related U.S. Application Data

(63) Continuation of application No. PCT/CN2018/075450, filed on Feb. 6, 2018.

(51) Int. Cl.
*G06K 9/00* (2006.01)
*H01L 27/32* (2006.01)
*H01L 27/146* (2006.01)

(52) U.S. Cl.
CPC ........ *G06K 9/0004* (2013.01); *H01L 27/3234* (2013.01); *H01L 27/14678* (2013.01)

(58) Field of Classification Search
CPC ............. G06K 9/0004; H01L 27/3234; H01L 27/14678
See application file for complete search history.

(56) References Cited

U.S. PATENT DOCUMENTS

| 9,829,614 | B2 * | 11/2017 | Smith | G02B 27/58 |
| 2004/0022422 | A1 * | 2/2004 | Yamauchi | G06Q 10/08 |
| | | | | 382/115 |
| 2006/0067564 | A1 * | 3/2006 | Miyasaka | G06K 9/0002 |
| | | | | 382/124 |

(Continued)

FOREIGN PATENT DOCUMENTS

| CN | 103942537 A | 7/2014 |
| CN | 205992193 U | 3/2017 |

(Continued)

*Primary Examiner* — John B Strege (57) ABSTRACT

Provided are an under-screen biometric identification apparatus, a biometric identification component and a terminal device. The under-screen biometric identification apparatus includes: a display screen and a biometric identification module, where the biometric identification module is fixedly disposed under the display screen, and there is a gap between the biometric identification module and the display screen. In an embodiment of the present application, the biometric identification module and a lower surface of the display screen are designed to be separated, which can reduce difficulty of disassembling the biometric identification module, thereby improving maintainability of the terminal device. Further, complexity of manufacturing the biometric identification module under the display screen can be reduced and a production success rate can be enhanced, and thus production cost is reduced.

5 Claims, 3 Drawing Sheets

(56) References Cited

U.S. PATENT DOCUMENTS

| | | | | |
|---|---|---|---|---|
| 2009/0191846 | A1* | 7/2009 | Shi | G06F 21/32 |
| | | | | 455/411 |
| 2011/0316415 | A1* | 12/2011 | Mizokami | H01J 11/12 |
| | | | | 313/587 |
| 2012/0256280 | A1* | 10/2012 | Erhart | H01L 21/561 |
| | | | | 257/414 |
| 2014/0278229 | A1* | 9/2014 | Hong | A63B 71/06 |
| | | | | 702/160 |
| 2014/0292184 | A1* | 10/2014 | Lee | H01L 51/5246 |
| | | | | 313/504 |
| 2014/0354597 | A1* | 12/2014 | Kitchens, II | G06F 1/3215 |
| | | | | 345/175 |
| 2015/0054764 | A1 | 2/2015 | Kim et al. | |
| 2015/0078635 | A1* | 3/2015 | Mankowski | G06K 9/00033 |
| | | | | 382/124 |
| 2015/0102829 | A1* | 4/2015 | Son | G06K 9/00053 |
| | | | | 324/692 |
| 2015/0177884 | A1* | 6/2015 | Han | G06F 3/044 |
| | | | | 345/174 |
| 2015/0331508 | A1* | 11/2015 | Nho | G06F 3/0421 |
| | | | | 345/173 |
| 2016/0140379 | A1* | 5/2016 | Pedersen | G06K 9/00919 |
| | | | | 726/19 |
| 2017/0079592 | A1* | 3/2017 | Park | H04B 1/3888 |
| 2017/0220838 | A1* | 8/2017 | He | G06K 9/0004 |
| 2017/0300736 | A1 | 10/2017 | Song et al. | |
| 2017/0364763 | A1* | 12/2017 | Jin | G06K 9/0002 |
| 2018/0012069 | A1 | 1/2018 | Chung et al. | |
| 2018/0196985 | A1* | 7/2018 | Ling | G06K 9/0004 |
| 2018/0314096 | A1 | 11/2018 | Yang et al. | |
| 2018/0315803 | A1 | 11/2018 | Jin | |
| 2018/0330141 | A1 | 11/2018 | Yang et al. | |

FOREIGN PATENT DOCUMENTS

| | | |
|---|---|---|
| CN | 107092311 A | 8/2017 |
| CN | 107102693 A | 8/2017 |
| CN | 107193412 A | 9/2017 |
| CN | 107241468 A | 10/2017 |
| CN | 107256067 A | 10/2017 |
| EP | 3258408 A1 | 12/2017 |
| EP | 3396442 A1 | 10/2018 |
| EP | 3401753 A1 | 11/2018 |
| JP | 2012070356 A | 4/2012 |
| JP | 2016536709 A | 11/2016 |
| WO | 2016/180053 A1 | 11/2016 |
| WO | 2017/075469 A1 | 5/2017 |

* cited by examiner

UNDER-SCREEN BIOMETRIC IDENTIFICATION APPARATUS, BIOMETRIC IDENTIFICATION COMPONENT AND TERMINAL DEVICE

CROSS-REFERENCE TO RELATED APPLICATIONS

The present application is a continuation of international application No. PCT/CN2018/075450, filed on Feb. 6, 2017, which is hereby incorporated by reference in its entirety.

TECHNICAL FIELD

Embodiments of the present disclosure relate to the technical field of biometric identification, and in particular, to an under-screen biometric identification apparatus, a biometric identification component and a terminal device.

BACKGROUND

A current under-screen fingerprint identification solution is to attach an optical fingerprint identification module or an ultrasonic fingerprint identification module to the bottom of an organic light-emitting diode (Organic Light-Emitting Diode, OLED) screen, that is, either the optical fingerprint identification module or the ultrasonic fingerprint identification module is required to be closely adhered to a light-emitting layer of the bottom of a screen.

As for a current fixed solution of the fingerprint identification module, although under-screen fingerprint identification is realized, the fingerprint identification module and the OLED screen are basically required to be tightly connected, and in this way problems are:

1. The OLED screen is costly and fragile, which is easily broken after the fingerprint identification module is attached.

2. It is difficult to replace the fingerprint identification module after being directly attached to the OLED screen, and further, it is easy to damage the OLED screen when the fingerprint identification module is replaced; that is, since the fingerprint identification module and the OLED screen are completely adhered, if the fingerprint identification module is damaged, it is easy to damage the OLED screen when the fingerprint identification module is disassembled.

3. An attaching process of directly attaching the fingerprint identification module to the OLED screen is complicated.

Due to the foregoing problems, the current under-screen fingerprint identification module inevitably has problems such as a low yield, high cost, and a complicated attaching process, which leads to an increase in cost and complexity of a terminal device and low maintainability.

SUMMARY

Provided are an under-screen biometric identification apparatus, a biometric identification component and a terminal device. The technical problems to be resolved are: problems such as maintenance difficulty, easy damage to a screen, and high cost for an attaching process when an under-screen biometric identification module and an OLED screen are fixed together.

In a first aspect, provided is an under-screen biometric identification apparatus, including:

a display screen and a biometric identification module, where the biometric identification module is fixedly disposed under the display screen, and there is a gap between the biometric identification module and the display screen.

In an embodiment of the present application, the biometric identification module and a lower surface of the display screen are designed to be separated, which can reduce difficulty of disassembling the biometric identification module, and thus, thereby improving maintainability of a terminal device. Further, complexity of mounting the biometric identification module under the display screen in a production process of the under-screen biometric identification apparatus can be reduced, and a production success rate of the under-screen biometric identification apparatus can be improved, and further production cost is reduced. Moreover, biometric identification stability and performance of the biometric identification module are not affected either.

In some possible implementations, the under-screen biometric identification apparatus further includes:

a fixing support, where the biometric identification module is fixedly disposed under the display screen through the fixing support.

In some possible implementations, the fixing support includes:

a middle frame, where an edge of a lower surface of the display screen is attached to an upper surface of the middle frame, and the biometric identification module is fixed to the middle frame.

In some possible implementations, the middle frame is provided with a hole formed in a mounting area of the biometric identification module, and the biometric identification module is fixedly disposed right under the hole.

In some possible implementations, a size of the hole is less than or equal to a size of the biometric identification module.

In some possible implementations, a side surface of the biometric identification module is fixedly connected to a hole wall of the hole, or an edge of an upper surface of the biometric identification module is fixedly connected to a lower surface of the middle frame.

In some possible implementations, the fixing support further includes:

a module support, where the biometric identification module is fixed to the middle frame through the module support.

In some possible implementations, a side surface of the biometric identification module is fixedly connected to an inner side surface of the module support, or an upper surface of the biometric identification module is fixedly connected to a lower surface of the module support; and an outer side surface of the module support is fixedly connected to a hole wall of the hole, or an upper surface of the module support is fixedly connected to a lower surface of the middle frame at a hole edge.

In some possible implementations, an upper surface of the module support is higher than an upper surface of the biometric identification module, and the gap includes a height difference between the upper surface of the module support and the upper surface of the biometric identification module.

In some possible implementations, the module support is provided with a cavity structure, and the biometric identification module is at least partially held and fixed within the cavity structure.

In some possible implementations, a top edge of the cavity structure extends inward to form an annular fixing part, and the upper surface of the biometric identification module is fixedly connected to a lower surface of the annular fixing part.

In some possible implementations, the being fixedly connected is a connection according to any one of the following connection methods:

a screw fixing method, a double-sided adhesive fixing method, a glue fixing method, a welding and fixing method and a coupling and fixing method.

In some possible implementations, the under-screen biometric identification apparatus further includes:

a foam gum, where the edge of the lower surface of the display screen is attached to the upper surface of the middle frame through the foam gum, and a width of the gap includes a thickness of the foam gum.

In some possible implementations, the upper surface of the middle frame is provided with a step structure formed in a peripheral area of the hole, and the width of the gap includes a height difference of the step structure.

In some possible implementations, the upper surface of the middle frame is provided with a bevel angle formed at the hole edge toward the display screen by chamfering processing.

In some possible implementations, the bevel angle extends to the hole edge of the lower surface of the middle frame facing away from the display screen, and the gap includes a projection height of a plane where the bevel angle is located in a direction perpendicular to the display screen.

In some possible implementations, the lower surface of the middle frame extends downward at the hole edge facing away from the display screen to form a convex structure.

In some possible implementations, the lower surface of the middle frame is provided with a convex ring surrounding the convex structure formed in a peripheral area adjacent to the convex structure, a lower surface of the convex ring is higher than a lower surface of the convex structure, and the biometric identification module is fixed within the convex ring.

In some possible implementations, the lower surface of the middle frame extends upward at the hole edge facing away from the display screen to form a groove structure, and the biometric identification module is fixed within the groove structure.

In some possible implementations, the fixing support includes:

a back cover, where the biometric identification module is fixed to the back cover.

In some possible implementations, the width of the gap is greater than or equal to a first distance, and the first distance is a minimum distance that the biometric identification module does not touch the display screen when a terminal device is in a shaking state.

In some possible implementations, the width of the gap ranges from 0.5 mm to 1 mm.

In a second aspect, provided is a biometric identification component, including:

a module support and a biometric identification module, where there is a gap between the biometric identification module and a display screen when the biometric identification module is fixed under the display screen through the module support.

In some possible implementations, a side surface of the biometric identification module is fixedly connected to an inner side surface of the module support, or an upper surface of the biometric identification module is fixedly connected to a lower surface of the module support; and an outer side surface of the module support is fixedly connected to a hole wall of a hole, or an upper surface of the module support is fixedly connected to a lower surface of a middle frame at a hole edge.

In some possible implementations, an upper surface of the module support is higher than an upper surface of the biometric identification module, and the gap includes a height difference between the upper surface of the module support and the upper surface of the biometric identification module when the biometric identification module is fixed under the display screen through the module support.

In some possible implementations, the module support is provided with a cavity structure, and the biometric identification module is at least partially held and fixed within the cavity structure.

In some possible implementations, a top edge of the cavity structure extends inward to form an annular fixing part, and the upper surface of the biometric identification module is fixedly connected to a lower surface of the annular fixing part.

In some possible implementations, the being fixedly connected is a connection according to any one of the following connection methods:

a screw fixing method, a double-sided adhesive fixing method, a glue fixing method, a welding and fixing method and a coupling and fixing method.

In some possible implementations, a width of the gap is greater than or equal to a first distance, and the first distance is a minimum distance that the optical fingerprint module does not touch the display screen when a terminal device including the display screen and the biometric identification component is in a shaking state.

In some possible implementations, the width of the gap ranges from 0.5 mm to 1 mm.

In a third aspect, provided is a terminal device, including:

the under-screen biometric identification apparatus according to the first aspect and any one of the possible implementations of the first aspect, or the biometric identification component according to the second aspect and any one of the possible implementations of the second aspect.

DESCRIPTION OF EMBODIMENTS

Technical solutions in embodiments of the present disclosure will be described hereinafter in conjunction with the attached drawings.

As a smart terminal enters a full screen era, a space for a fingerprint button on a front surface of the smart terminal is squeezed by the full screen, and therefore, an under-display or under-screen biometric identification technology causes increasing attention. A so-called under-screen biometric identification apparatus refers to mounting a biometric identification module (such as a fingerprint identification module) under a display screen, thereby realizing a biometric identification operation in a display area of the display screen.

As a common application scenario, the under-screen biometric identification apparatus provided by an embodiment of the present disclosure can be applied to any terminal device configured with a display screen and a biometric identification module, for example, a smart mobile phone, tablet, and other small personal portable devices, such as a personal digital assistant (Personal Digital Assistant, PDA), and an electronic book (electronic book, E-book). In the foregoing terminal device, the biometric identification module is disposed under the display screen, and the biometric identification module can perform optical biometric identification, ultrasonic biometric identification or other types of biometric identification, which can detect and identify a biometric feature (such as a fingerprint) of a user when the user performs an operation through the display screen.

For convenience of understanding and by way of example but not limitation, the terminal device being a smart phone and the biometric identification module being an optical fingerprint module serve as an application scenario, which is taken as an example hereinafter, and the under-screen biometric identification apparatus provided by the present application will be described.

Figure 1:
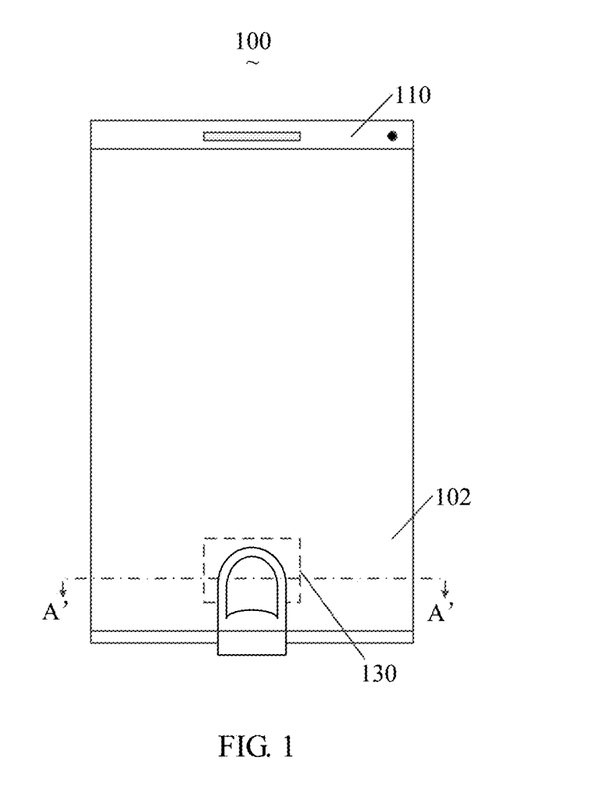
FIG. 1 is a schematic plan view of a mobile terminal to which the present disclosure is applicable.
Figure 2:
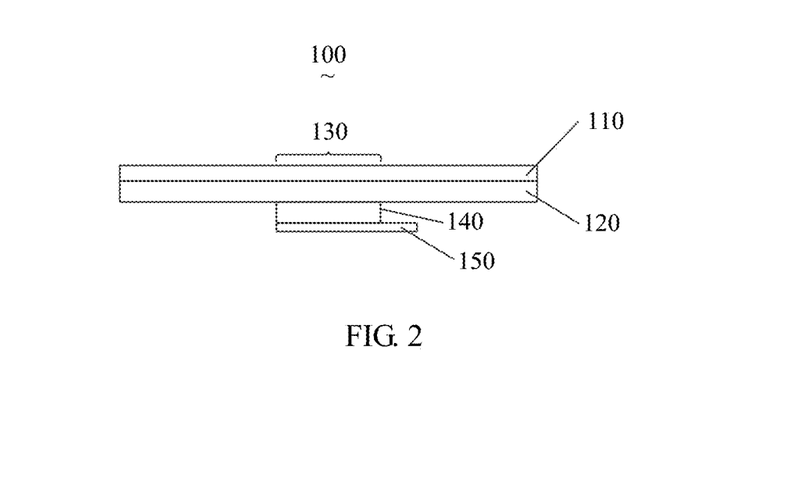
FIG. 2 is a partial schematic cross-sectional view of the mobile terminal shown in FIG. 1 taken along A'-A'.

Referring to FIG. 1 and FIG. 2, where FIG. 1 is schematic front view of a terminal device 100 to which an under-screen biometric identification apparatus is applicable, and FIG. 2 is a partial schematic cross-sectional structural view of the mobile terminal 100 in FIG. 1 taken along A'-A'. The terminal device 100 may be specifically a smart phone, which includes a display screen 120 and a biometric identification module 140; and the display screen 120 has a display area 102, and the biometric identification module 140 is disposed under the display screen 120.

The display screen 120 may be a self-emitting display screen, which adopts a self-emitting display unit as a display pixel, such as an organic light-emitting diode (Organic Light-Emitting Diode, OLED) display screen or a micro light-emitting diode (micro-LED) display screen. In other alternative embodiments, the display screen 120 may also be a liquid crystal display (Liquid Crystal Display, LCD) or other passive light-emitting display screens, which is not limited in the present application. On the other hand, the display screen 120 is specifically a touch display screen, which can not only display a screen but also detect a touching or pressing operation of a user, thereby providing the user with a human-machine interaction interface. For example, in an embodiment, the terminal device 100 may include a touch sensor, and the touch sensor may be specifically a touch panel (Touch Panel, TP) that may be disposed on a surface of the display screen 120 or may be partially integrated or entirely integrated into an interior of the display screen 120 to form the touch display screen.

A biometric identification module 140 may specifically be an optical biometric identification module, such as an optical fingerprint module, which is mainly used for capturing biometric information (such as fingerprint image information) of the user; and in this embodiment, the biometric identification module 140 can be at least disposed in a partial area under the display screen 120, such that a biometric capturing area (or a sensing area) 130 of the biometric identification module 140 is at least partially located in a display area 102 of the display screen 120.

As an embodiment, the biometric identification module 140 may specifically include an optical biometric sensor with an optical sensing array, such as an optical fingerprint sensor; and the optical sensing array includes a plurality of optical sensing units, and an area where the optical sensing array is located is the biometric capturing area 130 of the biometric identification module 140. As shown in FIG. 1, the biometric capturing area 130 is located in the display area 102 of the display screen 120, and therefore, when the user needs to unlock the terminal device or perform other biometric verification, a biometric input operation can be implemented merely by pressing a finger on the biometric capturing area 130 located in the display screen 120. Since biometric capturing detection can be implemented in the display area 102 of the display screen 120, a front surface of the terminal device 100 in the foregoing structure does not need to specifically reserve a space to set a fingerprint button (such as a Home button), so that a full screen solution can be adopted. Therefore, the display area 102 of the display screen 120 can be substantially extended to the entire front surface of the terminal device 100.

It should be understood that, although the biometric identification module being the under-screen optical biometric identification module is taken as an example in embodiments shown in FIG. 1 and FIG. 2, in other embodiments, the biometric identification module of the terminal device 100 can also adopt an ultrasonic biometric identification module or other types of biometric identification modules; and when it is applied to a fingerprint identification scenario, correspondingly, the optical biometric sensor can be replaced with an ultrasonic fingerprint sensor or other types of biometric sensors. The present application does not particularly limit the type and specific structure of a fingerprint sensor, as long as the forgoing fingerprint sensor can meet performance requirements for performing fingerprint identification in an interior of the display screen of the terminal device.

In the embodiment, the display screen 120 adopting the OLED display screen is taken as an example, the display screen 120 has an OLED display unit array distributed in an array, and the biometric identification module 140 can utilize an OLED display unit (that is, an OLED light source) of the OLED display screen 120 located in the biometric capturing area 130 as an excitation light source for biometric detection and identification. Of course, it should be understood that in other alternative implementations, the biometric identification module 140 may also provide an optical signal for biometric detection and identification by adopting an internal light source or an external light source; and in this case, the under-screen biometric identification apparatus can be applied not only to a self-emitting display screen such as an OLED display screen, but also to a non-self-emitting display screen such as a liquid crystal display screen or other passive light-emitting display screens. Moreover, the optical sensing array of the biometric identification module 140 is specifically a photo detector array including a plurality of photo detectors distributed in an array, and the photo detectors may server as the optical sensing unit described above.

When a finger touches, presses, or approaches (collectively referred to as pressing, for convenience of description) the biometric capturing area 130, light emitted by a display unit of the biometric capturing area 130 is reflected by the finger to form reflected light, and the reflected light may carry biometric information of the finger of the user. For example, after the light is reflected by a fingerprint of a surface of the finger of the user, since the reflected light of a ridge of the fingerprint of the finger is different from that of a valley, the reflected light carries fingerprint information of the user. The reflected light is returned to the display screen 120, received by a photo detector array of the biometric identification module 140 underneath, and converted into a corresponding electrical signal, that is, a biometric detection signal. The terminal device 100 can acquire the biometric information of the user based on the biometric detection signal, and can further perform biometric matching verification, thereby completing identity verification of a current user in order to confirm whether the current user has authority to perform a corresponding operation on the terminal device 100.

In other alternative embodiments, the biometric identification module 140 may also be disposed in an entire area under the display screen 120, so as to extend the biometric capturing area 130 to the entire display area 102 of the display screen 120, thereby realizing full screen biometric identification.

It should be understood that, in a specific implementation, the terminal device 100 further includes a protective cover 110; the protective cover 110 may specifically be a transparent cover, such as a glass cover or a sapphire cover, which is located on the display screen 120 and covers the front surface of the terminal device 100; and a surface of the protective cover 110 may also be provided with a protective layer. Therefore, in an embodiment of the present application, the so-called finger pressing the display screen 120 may actually refer to the finger pressing the cover 110 on the display screen 120 or covering a surface of the protective layer of the cover 110.

On the other hand, a circuit board 150, such as a flexible printed circuit (Flexible Printed Circuit, FPC), may be disposed under the biometric identification module 140; and the biometric identification module 140 may be soldered to the circuit board 150 through a soldering pad, and electrical interconnection and signal transmission with other peripheral circuits or other elements of the terminal device 100 are implemented by the circuit board 150. For example, the biometric identification module 140 may receive a control signal of a processing unit of the terminal device 100 through the circuit board 150, and may also output the biometric detection signal to the processing unit, a control unit, or the like of the terminal device 100 through the circuit board 150.

Figure 3:
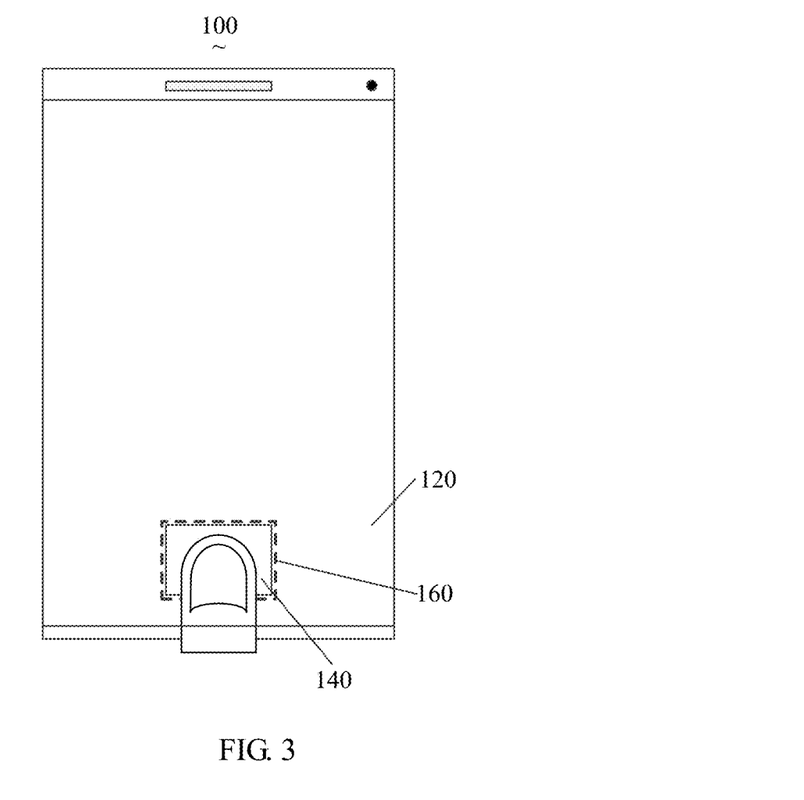
FIG. 3 is a schematic plan view of a typical under-screen biometric identification apparatus for attaching a biometric identification module to a lower surface of a display screen by means of dispensing.

As an implementation solution, in a typical under-screen biometric identification apparatus, a biometric identification module is generally bonded to a lower surface of a display screen. For example, as shown in FIG. 3, a biometric identification module 140 can be completely fixed to a lower surface of a display screen 120 through an adhesive 160 by means of dispensing.

Figure 4:
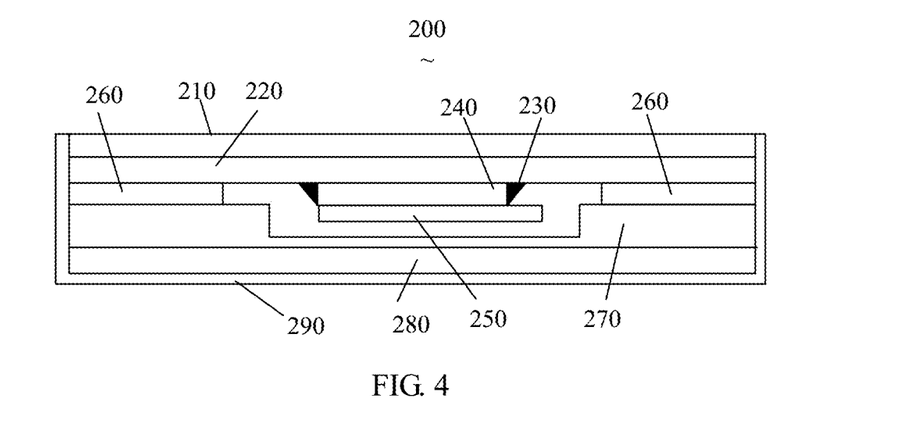
FIG. 4 is a schematic side cross-sectional view of another under-screen biometric identification apparatus for attaching a biometric identification module to a lower surface of a display screen.

Referring to FIG. 4, in another typical under-screen biometric identification apparatus, a lower surface of a protective cover 210 is attached to an upper surface of an OLED display screen 220, and a biometric identification module 240 is attached to a lower surface of the display screen 220 through an adhesive 230 by means of dispensing, and a lower surface of the biometric identification module 240 is soldered and fixed to the circuit board 250. Specifically, the adhesive 230 may be formed on an outer side wall of the biometric identification module 240, such that the outer side wall of the biometric identification module 240 is fixedly attached to the lower surface of the display 220 completely. In addition, an edge of the lower surface of the OLED display screen 220 is attached to an upper surface of a middle frame 270 through a foam gum 260, the middle frame 270 has a groove structure in an area where the biometric identification module 240 is located, and the groove structure can be used for providing an evasive space for the biometric identification module 240 and the circuit board 250 underneath. In addition, a battery 280 may be disposed between the middle frame 270 and a back cover 290.

It can be found that, although a design structure shown in FIG. 4 realizes fingerprint identification under the display screen, the biometric identification module and the display screen are required to be tightly connected, which causes the following problems:

1. An OLED display screen 220 is costly and fragile, which is easily damaged during an attaching process of the biometric identification module 240 and the OLED display screen 220.

2. It is difficult to replace the biometric identification module 240 after being directly attached to the OLED display screen 220, and furthermore, it is easy to damage the OLED display screen 220 when the biometric identification module 240 is replaced. That is, since the biometric identification module 240 and the OLED display screen 220 are completely adhered, if the biometric identification module 240 is damaged, it is easy to damage the OLED display screen when the biometric identification module 240 is disassembled from the lower surface of the OLED display screen 220.

3. An attaching process of directly attaching the biometric identification module 240 to the lower surface of the OLED display screen 220 is complicated.

Due to the foregoing problems, the under-screen fingerprint identification apparatus adopting the forgoing structure inevitably has problems such as a low yield, high cost, and a complicated attaching process in a production process, which leads to an increase in cost and complexity of a terminal device and low maintainability.

Therefore, in order to resolve the forgoing problems, in an embodiment of the present disclosure, provided is an under-screen biometric identification apparatus, which can resolve problems that a process of attaching a biometric identification module of a legacy under-screen biometric identification apparatus to the display screen is complicated, attaching cost thereof is higher, and it is easy to damage the display screen during an attaching process and a maintenance process.

Figure 5:
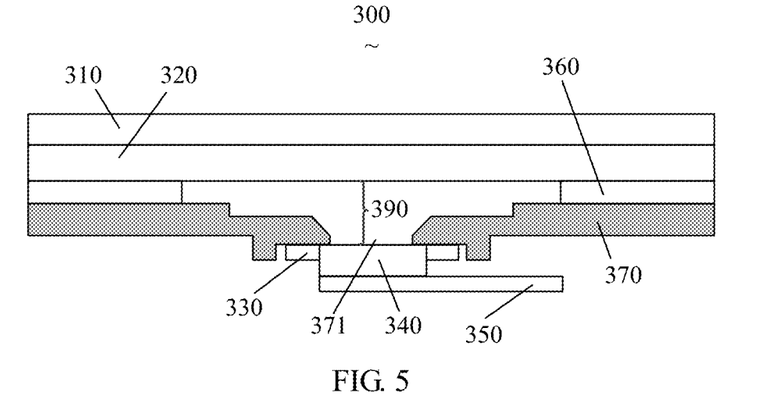
FIG. 5 is a schematic design view of an under-screen biometric identification apparatus provided in an embodiment of the present disclosure.
Figure 6:
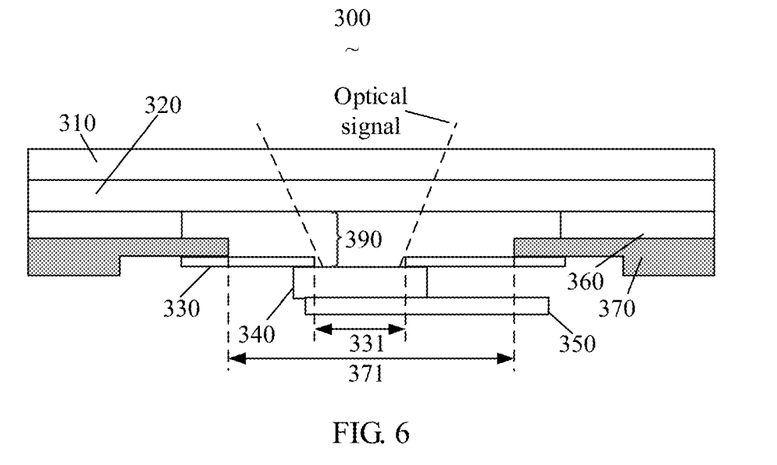
FIG. 6 is a schematic design view of another under-screen biometric identification apparatus provided in an embodiment of the present disclosure.

FIG. 5 and FIG. 6 are a schematic structural view of an under-screen biometric identification apparatus provided in an embodiment of the present disclosure. Specifically, as shown in FIG. 5 or FIG. 6, the under-screen biometric identification apparatus may include a display screen 320 and a biometric identification module 340. The display screen 320 may be the OLED display screen 120 as shown in FIG. 1 and FIG. 2, and the biometric identification module 340 may be the biometric identification module 140 as shown in FIG. 1 and FIG. 2. The biometric identification module 340 can be fixedly disposed under the display screen 220, and there is a gap 390 between the biometric identification module 340 and the display screen 320. The biometric identification module 340 can be used for capturing a fingerprint or other biometric features, and a biometric capturing area is at least partially located within a display area of the display screen 320. A specific structure, function, and biometric detection and identification process of the display screen 320 and the biometric identification module

340 may refer to the previous description of the OLED display screen 120 and the biometric identification module 140, which will not be repeated redundantly herein.

In an embodiment of the present disclosure, the biometric identification module 340 is not directly in contact with the display screen 320, that is, a separation design is adopted between the biometric identification module 340 and the display screen 320; as an optionally implementation, the biometric identification module 340 can be mounted under the display screen 320 by being fixedly connected to an easily disassembled device in an interior of the terminal device, while ensuring that there is a gap 390 between the biometric identification module 340 and the display screen 320; and the easily disassembled device can serve as a fixing support between the biometric identification module 340 and the display screen 320. In other words, the biometric identification module 340 can be fixedly disposed under the display screen 320 in a non-contact manner through other auxiliary elements. For example, the biometric identification module 340 can be fixed to the fixing support, and fixedly disposed under the display screen 320 through the fixing support. Thus, the biometric identification module 340 and the display screen 320 are completely decoupled, thereby avoiding damage to the display screen 320 when the biometric identification module 340 is mounted or disassembled.

A width of the gap can be greater than or equal to a first distance, and the first distance is a minimum distance that the biometric identification module 340 does not touch the display screen 320 when a terminal device is in a shaking state such as a drop or a collision. For example, the width of the gap may range from 0.5 mm to 1 mm. It should be noted that, the range is only an exemplary range of the gap, and the embodiment of the present application is not limited thereto.

As a specific implementation, when the under-screen biometric identification apparatus is applied to a mobile terminal (such as a smart phone), as shown in FIG. 5, the biometric identification module 340 and the display screen 320 can be fixed under the display screen 320 through a middle frame 370 or other components of the mobile terminal, such that there is a gap 390 between the biometric identification module 340 and the display screen 320. In the embodiment, taking the middle frame 370 shown in FIG. 5 as an example, the middle frame 370 can serve as a fixing support between the biometric identification module 340 and the display screen 320. The middle frame 370 is disposed between the display screen 320 and a back cover and is used for carrying frames of various internal components, and the various internal components include, but are not limited to, a battery, a mainboard, a camera, a flex cable, various sensors, a microphone, an earpiece, or the like. In an embodiment of the present application, the biometric identification module 340 is fixed through the middle frame 370, while ensuring that there is a gap 390 between the biometric identification module 340 and the display screen 320, and therefore, the biometric identification module 340 and the display screen 320 are completely decoupled, thereby avoiding damage to the display screen 320 when the biometric identification module 340 is mounted or disassembled.

The middle frame 370 can specifically be made of a metal or an alloy material, or even made of a plastic material. In this case, the middle frame 370 can even be integrally provided with a bezel of the mobile terminal, and the so-called integration means that an inner middle frame and the bezel are as a whole. For example, the bezel may be just a metal welt, or a metal-like coating may be applied to the middle frame. Further, the middle frame 370 may also be a composite middle frame, for example, including an inner middle frame 1 and an outer middle frame 2; the inner middle frame 1 is used for carrying component parts of a mobile phone, the outer middle frame 2 is located outside the inner middle frame 1, and an outer edge of the outer middle frame 2 is equipped with a button of the mobile phone, and the inner middle frame 1 is integrated with the outer middle frame 2. Since the middle frame of the mobile phone is designed to include an inner middle frame and an outer middle frame and the inner middle frame and the outer middle frame are integrated, when the mobile phone is impacted, the outer middle frame is firstly wear out, and due to the fact that the outer middle frame merely has buttons, it is simple and convenient to replace the outer middle frame, and the cost is low. Further, an elastic material may be disposed between the inner and outer middle frames, and since the inner and outer middle frames are relatively fixed under an elastic force of an elastic layer, the elastic layer may reduce an impact on the inner middle frame when the outer middle frame is subjected to an impact force.

It should be understood that, although the middle frame 370 serving as the fixing support is taken as an example in the forgoing embodiment, in other embodiments, the biometric identification module 340 can be mounted under the display screen 320 by being fixedly connected any easily disassembled device in an interior of the terminal device, while ensuring that there is a gap 390 between the biometric identification module 340 and the display screen 320, so long as the biometric identification module 340 can be fixedly disposed under the display screen 320 in a non-contact manner. In other embodiments, the biometric identification module 340 may also be fixed to an easily disassembled device such as a back cover, mainboard, and battery of the mobile terminal, and is further fixedly disposed under the display screen 320.

In the embodiment of the present disclosure, since the biometric identification module 340 is disposed under the display screen 320 in the non-contact manner and is not in contact with the lower surface of the display screen 320, that is, the biometric identification module 340 and the display screen 320 are completely decoupled, thereby avoiding damage to the display screen 320 when the biometric identification module 340 is disassembled. In addition, since the biometric identification module 340 is not in contact with the lower surface of the display screen 320, a fixed gap 390 is maintained therebetween, and the gap 390 may be an air gap that is not filled with any auxiliary material, which can ensure that the biometric identification module 340 do not touch the lower surface of the display screen 320 when the display screen 320 is pressed or the terminal device is dropped or collided, and stability and performance of biometric identification for the biometric identification module 340 are not affected. In other words, in an embodiment of the present application, the biometric identification module 340 and the lower surface of the display screen 320 are designed to be separated, which could reduce difficulty of disassembling the biometric identification module 340, thereby improving maintainability of the terminal device. Further, complexity of mounting the biometric identification module 340 under the display screen 320 in a production process of the under-screen biometric identification apparatus could be reduced, and a production success rate of the under-screen biometric identification apparatus could be improved, and further, production cost is reduced. Moreover, the stability and performance of the biometric identification for the biometric identification module 340 are not affected either.

In this embodiment, the biometric identification module 340 being fixed to the lower surface of the middle frame 370 is taken as an example. The biometric identification module 340 may be disposed on the lower surface of the middle frame 370, and there is a gap 390 between the biometric identification module 340 and the display screen 320 through the middle frame 370. As shown in FIG. 5, the edge of the lower surface of the display screen 320 may be attached to the upper surface of the middle frame 370; and the biometric identification module 340 is disposed under the display screen 320 and is fixed to the middle frame 370, and there is a gap 390 between the biometric identification module 340 and the display screen 320. The edge of the lower surface of the display screen 320 being attached to the upper surface of the middle frame 370 may be understood as: the display screen 320 and the middle frame 370 are fixedly connected to each other by means of attaching the edge of the lower surface of the display screen 320 to the upper surface of the middle frame 370. In other alternative embodiments, the biometric identification module 340 may be disposed on the upper surface of the middle frame 370 and maintain a gap having a predetermined width with the display screen 320. In a specific implementation, the middle frame 370 may be provided with a groove structure formed in a mounting area of the biometric identification module 340, the middle frame 370 is fixed within the groove structure, and the groove structure may be used to provide an accommodation space for the biometric identification module 340.

The biometric identification module 340 may be disposed on the lower surface of the middle frame 370, which is taken as an example to illustrate: it can be understood that, if the biometric identification module 340 performs biometric detection by optical method, for example, an optical fingerprint identification module, the biometric identification module 340 needs to detect reflected light formed by reflection of a finger from an optical signal emitted by the display screen 320. Therefore, further, when the biometric identification module 340 may be disposed on the lower surface of the middle frame 370, in order to ensure that the biometric identification module 340 can receive the reflected light, in an optional solution, the middle frame 370 is provided with a hole 371 formed in a mounting area of the biometric identification module 340, the biometric identification module 340 is disposed under the hole 371, and an optical sensing array is disposed just opposite the lower surface of the display screen 320 through the hole 371. In this embodiment, a size of the hole 371 of the middle frame 370 is less than or equal to a size of the biometric identification module 340.

The biometric identification module 340 and the middle frame 370 may be fixedly connected directly by adopting this structural design. Specifically, a side surface of the biometric identification module 340 may be fixedly connected to a hole wall of the hole 371; or an edge of an upper surface of the biometric identification module 340 is fixedly connected to an area of a lower surface of the middle frame 370 that is located around the hole 371. In the embodiment of the present disclosure, the manner in which the biometric identification module 340 is fixedly connected to the middle frame 370 directly is merely an exemplary description, and the embodiment of the present disclosure is not limited thereto. In other embodiments, the biometric identification module 340 may also be fixedly connected to the middle frame 370 through a connector. For example, as shown in FIG. 5, the under-screen biometric identification apparatus may further include: a module support 330, which may serve as a connector between the biometric identification module 340 and the middle frame 370 for implementing a fixed connection therebetween. For example, a side surface of the biometric identification module 340 may be fixedly connected to an inner side surface of the module support 330, or an edge of an upper surface of the biometric identification module 340 may be fixedly connected to a lower surface of the module support 330; whereas an outer side surface of the module support 330 is fixedly connected to a hole wall of the hole 371, or an upper surface of the module support 330 is fixedly connected to an area of the lower surface of the middle frame 370 that is located around the hole 371 (that is, at a hole edge). Alternatively, as shown in FIG. 5, a side surface of the biometric identification module 340 may be fixed to an inner side surface of the module support 330, and an edge of an upper surface of the biometric identification module 340 and an upper surface of the module support 330 may be simultaneously fixed to an area of a lower surface of the middle frame 370 that is located around the hole 371 (that is, at a hole edge). A fixed connection includes, but not limited to, the following connection methods: a screw fixing method, a double-sided adhesive fixing method, a glue fixing method, a welding and fixing method and a coupling and fixing method.

In this embodiment, in order to further ensure that there is a gap between the biometric identification module 340 and the display screen 320, the upper surface of the module support 330 may be allowed to be higher than the upper surface of the biometric identification module 340. In addition, since the upper surface of the foregoing module support 330 may be higher than the upper surface of the biometric identification module 340, the biometric identification module 340 and at least one surface of the module support 330 may be fixedly connected, thereby increasing a contact area between the biometric identification module 340 and the module support 330, and increasing stability of the fixed connection when the biometric identification module 340 is fixedly connected to the module support 330 by a double-sided adhesive fixing method or a glue fixing method.

In other embodiments, in order to increase stability of the fixed connection between the biometric identification module 340 and the module support 330, the module support 330 may further be provided with a cavity structure, and the cavity structure is aligned with the hole 371 of the middle frame 370, which can provide an accommodation space for the biometric identification module 340, and the biometric identification module 340 is at least partially held and fixed within the cavity structure. For example, a side surface of the biometric identification module 340 is fixedly connected to an inner side surface of the module support 330 through the cavity structure. Further, in order to ensure certain stability of the fixed connection for the biometric identification module 340 and the module support 330 through the cavity structure, as an embodiment, a shape of the cavity structure may be a shape of the biometric identification module 340. As another embodiment, the cavity structure can be further optimized. For example, a top edge of the cavity structure of the module support 330 may extend inward to form an annular fixing part, and an edge of an upper surface of the biometric identification module 340 may be fixed to a lower surface of the annular fixing part, and an upper surface of the annular fixing part is flush with an upper surface of a main body of the module support 330. The annular fixing part of the module support 330 is utilized so that a connection between the biometric identification module 340 and the module support 330 in the internal of the cavity structure can be more stable, and in this case, the upper surface of the module support 330 is higher than the upper surface of the biometric identification module 340, and a height difference therebetween can further increase a width of the gap between the display screen 320 and the biometric identification module 340. In the embodiment of the present disclosure, a main function of the module support 330 is to fixedly connect the biometric identification module 340 to the middle frame 370, and allows for a gap between the biometric identification module 340 and the display screen 320. The specific structure of the module support 330 is not limited in the embodiment of the present disclosure.

In addition, the middle frame 370 of the terminal device may adopt a metal middle frame or an aluminum alloy middle frame, and a requirement for the width of the gap between the display screen 320 and the biometric identification module 340 may not be satisfied due to a thinner or thicker thickness of the middle frame. Therefore, in order to ensure a sufficient width of the gap between the biometric identification module 340 and the display screen 320 in the embodiment of the present disclosure, in an embodiment of the present disclosure, a structural design of the middle frame 370 can be further optimized.

In an actual product, if a thickness of the middle frame 370 is thinner, as an embodiment, thickening processing can be performed for a mounting area of the biometric identification module 340 on the middle frame 370. For example, as shown in FIG. 5, the middle frame 370 may be provided with the hole 371 formed at the foregoing mounting position, and an edge of the hole 371 of the middle frame 370 may also extend downward to form a convex structure, and further the biometric identification module 340 may be directly mounted to or fixed to a lower surface of the convex structure through the module support 330. Further, for the convenience of placing the biometric identification module 340, in an optional embodiment of the present disclosure, the lower surface of the middle frame is provided with a convex ring surrounding the convex structure formed in a peripheral area adjacent to the convex structure; a lower surface of the convex ring is higher than the lower surface of the convex structure, and the biometric identification module is fixed within the convex ring. For example, in the embodiment shown in FIG. 5, the lower surface of the middle frame 370 may also be provided with the convex ring around the hole 371 formed in an area of a step structure, and the biometric identification module 340 may be located at an inner side of the convex ring after being mounted to the middle frame 370. On one hand, the convex ring could ensure that the middle frame 370 still has higher strength after thinning the peripheral area of the hole 371, and on the other hand, the convex ring could also protect the biometric identification module 340 at the inner side. As an optionally implementation, the biometric identification module 340 may also be fixed to the convex ring through the module support 330. Correspondingly, in other embodiments, if a thickness of the middle frame 370 is thicker, and as an embodiment, thinning processing can be performed for the mounting area of the biometric identification module 340 on the middle frame 370. For example, as shown in FIG. 6, the lower surface of the middle frame 370 may be directly provided with a groove structure, and the hole is disposed in the groove structure. In other words, the lower surface of the middle frame extends upward at a hole edge facing away from the display screen to form a groove structure, and the biometric identification module is fixed within the groove structure.

Further, as shown in FIG. 5, when applied to a terminal device, the under-screen biometric identification apparatus may also include: a cover 310, a circuit board 350, and a foam gum 360. The cover 310 may be a transparent protective cover, such as a glass cover or a sapphire cover, which may cover the display screen 320, and a lower surface of the cover 310 may be attached to an upper surface of the display screen 320 (that is, a display plane). The circuit board 350 can be a printed circuit board or a flexible circuit board, and used for supporting the biometric identification module 340, and the biometric identification module 340 may be connected to a peripheral element or an external circuit through the circuit board 350. The edge of the lower surface of the display screen 320 may be attached to the upper surface of the middle frame 370 through the foam gum 360. In this embodiment, except for providing attachment between the display screen 320 and the middle frame 370, the foam gum 360 may have a certain thickness; the thickness of the foam gum 360 may allow for having a certain thickness between the lower surface of the display screen 320 and the upper surface of the middle frame 370, and the forgoing distance may be a part of the gap 390 between the display screen 320 and the biometric identification module 340.

On the other hand, when the middle frame 370 has a certain thickness, in order to make full use of the thickness of the middle frame 370, the thinning processing can be performed on the upper surface of the middle frame 370 in the peripheral area of the hole 371, thereby forming a step structure in the peripheral area of the hole, that is, a thickness of the middle frame 370 in the peripheral area of the hole 371 is less than a thickness of a main body of the middle frame 370. The height difference of the step structure may also be used as a portion of the gap 390 between the display screen 320 and the biometric identification module 340. Moreover, chamfering processing is performed on the hole edge of the hole 371 of the middle frame 370 toward the display screen 320 to form a bevel angle, and the bevel angle can be more favorable for reflected light to enter the biometric identification module 340 from the hole 371 of the middle frame 370, thereby improving biometric detection performance and detection efficiency of the under-screen biometric identification apparatus. Further, the bevel angle extends to the hole edge of the lower surface of the middle frame facing away from the display screen, such that the gap includes a projection height of a plane where the bevel angle is located in a direction perpendicular to the display screen.

In an embodiment of the present disclosure, the biometric identification module 340 being fixedly connected to the middle frame 370 is taken as an example, while ensuring that there is a gap between the biometric identification module 340 and the display screen 320. Of course, it should be understood that in other alternative implementations, the biometric identification module 340 may also be mounted under the display screen 320 by being fixedly connected any easily disassembled device in an interior of the terminal device, while ensuring that there is a gap 390 between the biometric identification module 340 and the display screen 320. For example, in another embodiment, a terminal device applying the under-screen biometric identification module may also include a back cover, and the biometric identification module 340 may be fixedly connected to the back cover directly or fixedly connected to the back cover through the module support 330, which replaces an implementation solution of being mounted to the middle frame 370 shown in FIG. 5.

Through the foregoing analysis, it can be found that, in an embodiment of the present disclosure, the biometric identification module 340 is designed to be separated from the display screen 320, for example, the biometric identification module 340 can be fixed on the middle frame 370 or the back cover structure, so as to resolve problems such as disassembling difficulty, easy damage to the display screen 320, and high attaching process difficulty that result from directly bonding the biometric identification module 340 to the display screen 320 with respect to the current under-screen biometric identification apparatus. In addition, in the embodiment of the present disclosure, a gap is formed between the biometric identification module 340 and the lower surface of the display screen 320, and the gap can ensure that the biometric identification module 340 does not touch the lower surface of the display screen 320 when the display screen 320 is pressed or when the terminal device is dropped or collided, thereby avoiding damage to the display screen 320.

It should be understood that, the structure of the under-screen biometric identification apparatus in the embodiment shown in FIG. 5 and FIG. 6 is merely an exemplary description. Specifically, the under-screen biometric identification apparatus shown in FIG. 5 or FIG. 6 may also be applied to a smart phone or other terminal device, and the under-screen biometric identification apparatus also includes a display screen 320 and a biometric identification module 340. The biometric identification module 340 can be disposed under the display screen 320 in a non-contact manner through the middle frame 370 inside the terminal device. The upper surface of the display screen 320 may be covered with a cover 310, and the edge of the lower surface of the display screen 320 is attached to the upper surface of the middle frame 370 through the foam gum 360. Moreover, the biometric identification module may be connected to the circuit board 350 and connected to a peripheral element or an external circuit through the circuit board 350. Further, the middle frame 370 is provided with a hole 371, and the biometric identification module 340 is disposed under the hole 371 to ensure that the reflected light returned from the display screen 320 can be received through the hole 371. In the embodiment shown in FIG. 6, the size of the hole 371 of the middle frame 370 is greater than the size of the biometric identification module 340, and therefore, the biometric identification module 340 needs to be fixed to the middle frame 370 through the module support 330.

In addition, as shown in FIG. 6, the biometric identification module 340 may be mounted to the lower surface of the module support 330, and the module support 330 has an aperture 331 (cavity structure), and the aperture 331 of the module support 330 and the hole 371 of the middle frame 370 are aligned with each other, such that the reflected light may pass through the hole 371 of the middle frame 370 and the aperture 331 of the module support 330 and the reflected light is received by the biometric identification module 340. A distance between the module support 330 having the aperture 331, the middle frame 370 having the hole 371, the upper surface of the middle frame 370 and the lower surface of the display screen 320 constitutes the gap between the display screen 320 and the biometric identification module 340. Alternatively, the biometric identification module 340 may also be mounted inside the aperture 331 of the module support 330, for example, the outer side surface of the biometric identification module 340 may be fixed to an inner side surface of the aperture 331. In addition, the lower surface of the middle frame 370 may be provided with a groove structure formed in a periphery area of the hole 371, the groove structure can be used for accommodating the module support 330, and an edge of an upper surface of the module support 330 may be fixed to a surface of the groove structure of the middle frame 370.

In an embodiment of the present disclosure, a biometric identification component is further provided, which may include a biometric identification module and a module support; when applied to the under-screen biometric identification apparatus or terminal device as described above, the biometric identification component may be directly mounted to a middle frame or a fixing support of the terminal device. However, when the biometric identification apparatus or the biometric identification module of the terminal device is damaged, the damaged biometric identification component may be replaced, and therefore, maintenance difficulty of replacing the under-screen biometric identification apparatus and complexity of replacing the device could be further reduced, thereby avoiding damage to the display screen.

Figure 7:
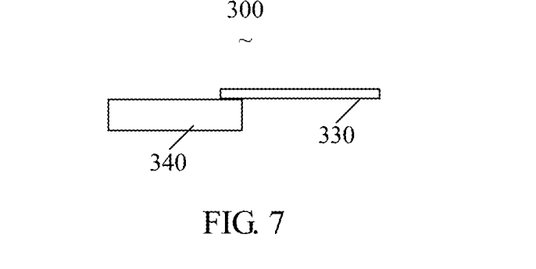
FIG. 7 is a schematic block diagram of a biometric identification component according to an embodiment of the present disclosure.

FIG. 7 is a schematic block diagram of a biometric identification component according to an embodiment of the present disclosure. As shown in FIG. 7, the biometric identification component includes: a module support 330 and a biometric identification module 340; a specific structure of the module support 330 and the biometric identification module 340 and a structural relationship thereof can be referred to the related description of the forgoing FIG. 5 and FIG. 6, which will not be repeated redundantly herein.

It should also be noted that, terms used in embodiment of the present disclosure and the claims appended hereto are merely for the purpose of describing particular embodiments, and are not intended to limit the embodiments of the present disclosure. For example, the use of a singular form of "a", "the" and "said" in the embodiment of the present disclosure and the claims appended hereto are also intended to include a plural form, unless otherwise clearly indicated herein by context.

Persons of ordinary skill in the art may be aware that, various exemplary units described in conjunction with the embodiments disclosed herein may be implemented by electronic hardware or a combination of computer software and electronic hardware. Whether these functions are executed in hardware or software mode depends on a particular application and a design constraint condition of the technical solution. Persons skilled in the art may use different methods to implement the described functions for every particular application, but it should not be considered that such implementation goes beyond the scope of the present application. Persons skilled in the art may clearly understand that the apparatus and units described may or may not be physically separated for clarity and brevity. A part of or all of the units may be selected according to actual demands to achieve objectives of the embodiments of the present disclosure. The forgoing contents are merely a specific implementation of the embodiments of the present disclosure, but the protection scope of the present disclosure is not limited thereto. Various modifications or replacements may be readily conceivable to any person skilled in the art within the technical scope disclosed in the present application, and such modifications or replacements shall fall within the protection scope of the present application. Therefore, the protection scope of the embodiments the present disclosure shall be defined by the claims.

What is claimed is:

1. An under-screen biometric identification apparatus, arranged under a display screen having a display area, the under-screen biometric identification apparatus comprising:
   a fixing support; and
   a biometric identification module mounted to the fixing support and disposed under the display screen through the fixing support, wherein a biometric capturing area of the biometric identification module is located in the display area of the display screen;

wherein the under-screen biometric identification apparatus is applied to a terminal device, and the fixing support is a middle frame of the terminal device;

the middle frame is formed with a hole in a mounting area of the biometric identification module; and the biometric identification module is fixed to an area of a lower surface of the middle frame located around the hole; and the biometric identification module is fixed to the middle frame without contacting to the display screen, so as to form a gap between the biometric identification module and the display screen;

wherein an upper surface of the middle frame is provided with a bevel angle formed by chamfering processing at an edge of the hole, and the bevel angle enables a width of the hole on the upper surface of the middle frame to be greater than a width of the hole on the lower surface of the middle frame.

2. The under-screen biometric identification apparatus according to claim 1, wherein an upper surface of the middle frame is provided with a step structure formed in an edge area of the hole.

3. The under-screen biometric identification apparatus according to claim 1, wherein the lower surface of the middle frame extends downward in a peripheral area of the hole to form a convex structure, and the biometric identification module is mounted in an interior of the convex structure.

4. The under-screen biometric identification apparatus according to claim 1, wherein the lower surface of the middle frame extends upward in an edge area of the hole to form a groove structure, and the biometric identification module is mounted in the groove structure.

5. An under-screen biometric identification apparatus, arranged under a display screen having a display area, the under-screen biometric identification apparatus comprising:
a fixing support; and
a biometric identification module mounted to the fixing support and disposed under the display screen through the fixing support, wherein a biometric capturing area of the biometric identification module is located in the display area of the display screen;

wherein the under-screen biometric identification apparatus is applied to a terminal device, and the fixing support is a middle frame of the terminal device;

the middle frame is formed with a hole in a mounting area of the biometric identification module; and the biometric identification module is fixed to an area of a lower surface of the middle frame located around the hole; and the biometric identification module is fixed to the middle frame without contacting to the display screen, so as to form a gap between the biometric identification module and the display screen;

the fixing support further comprising:

a module support, wherein the biometric identification module is fixed to the middle frame through the module support;

wherein a side surface of the biometric identification module is fixedly connected to an inner side surface of the module support, or an upper surface of the biometric identification module is fixedly connected to a lower surface of the module support; and an outer side surface of the module support is fixedly connected to a hole wall of the hole, or an upper surface of the module support is fixedly connected to a lower surface of the middle frame at an edge of the hole;

wherein the module support is provided with a cavity structure, the biometric identification module is at least partially held and fixed within the cavity structure; and a top edge of the cavity structure extends inward to form an annular fixing part, and the upper surface of the biometric identification module is fixedly connected to a lower surface of the annular fixing part.

\* \* \* \* \*

UNITED STATES PATENT AND TRADEMARK OFFICE
CERTIFICATE OF CORRECTION

PATENT NO. : 10,565,425 B2  
APPLICATION NO. : 16/113457  
DATED : February 18, 2020  
INVENTOR(S) : Jun Cai Page 1 of 1

It is certified that error appears in the above-identified patent and that said Letters Patent is hereby corrected as shown below:

In the Specification

Column 1, Line 10: delete "2017" and insert --2018--.

Signed and Sealed this  
Twenty-fourth Day of March, 2020

Andrei Iancu  
*Director of the United States Patent and Trademark Office*